L. R. DAWLEY.
TRAILER HITCH.
APPLICATION FILED DEC. 2, 1915.
1,183,171.
Patented May 16, 1916.
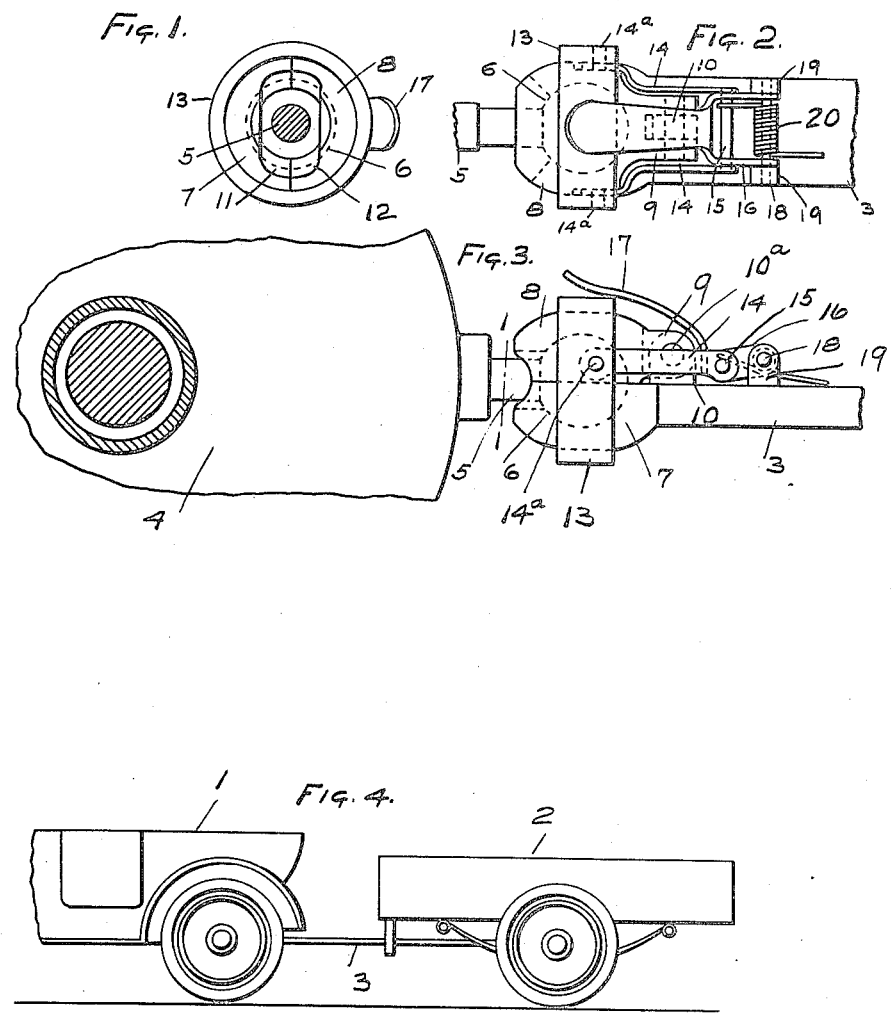

UNITED STATES PATENT OFFICE.

LAWERNCE R. DAWLEY, OF NORTH EAST, PENNSYLVANIA, ASSIGNOR TO FERNALD MANUFACTURING COMPANY, OF NORTH EAST, PENNSYLVANIA, A CORPORATION OF PENNSYLVANIA.

TRAILER-HITCH.

1,183,171.      Specification of Letters Patent.      Patented May 16, 1916.

Application filed December 2, 1915. Serial No. 64,637.

*To all whom it may concern:*

Be it known that I, LAWERNCE R. DAWLEY, a citizen of the United States, residing at North East, in the county of Erie and State of Pennsylvania, have invented new and useful Improvements in Trailer-Hitches, of which the following is a specification.

This invention relates to a trailer hitch and consists in certain improvements in the construction thereof as will be hereinafter fully described and pointed out in the claim.

The invention is illustrated in the accompanying drawings as follows:—

Figure 1 shows a section on the line 1—1 in Fig. 3. Fig. 2 a plan view of the hitch. Fig. 3 a side elevation with a portion of an automobile axle. Fig. 4 the rear end of an automobile with the trailer in place.

1 marks the automobile which is ordinarily the tractor for the trailer and 2 the trailer. The trailer is provided with the tongue 3 and a portion of the axle of the automobile is indicated at 4.

A stem 5 is secured to the rear of the axle 4 and terminates in a ball 6. The socket engaging this ball is formed of the parts 7 and 8. The upper part 8 of the socket has a rearwardly extending slotted ear 9 which extends over a lug 10 and the hinge pintle 10ª extends through the ear and lug forming a pivotal connection between the part 8 and the shank of the hinged end of the tongue 3. The part 7 of the socket has the longitudinally extending slot 11 and the part 8 a similar slot 12 so that when the socket is closed there is a slot extending horizontally through which the stem 5 extends. This permits of sufficient play to take care of the relative movements of the trailer and tractor through uneven conditions of road.

In order to secure and lock the socket in its closed position I provide a ring 13 which surrounds the members of the socket and holds the hinged part 8 in close relation with the part 7 and thus prevents the disengagement of the ball 6. Links 14 are pivotally secured to the ring by pins 14ª. They extend rearwardly and are connected by a pin 15 with a lever 16. The lever 16 is pivoted by means of the pin 18 between the ears 19 extending upwardly from the shank 3. A spring 20 is coiled around the pin 18, one end being arranged against the pin 15 and the other against the shank 3. The spring tends to force the lever 16 toward the socket and thus acting as a toggle lever through the links 14 moves the ring 13 forward and locks it securely in this forward position. The lever 16 has an extension 17 by means of which it may be readily swung back carrying with it the ring 13 and permitting the opening of the element 8 of the socket.

Preferably the socket is carried by the tongue. The operator presses the extension 17 to the rearward position thus carrying the ring 13 out of locking position on the socket members. The tongue can then be pushed forward carrying the socket members against the ball 6. The ball enters between the socket members and the release of the lever 16 permits the movement of the ring to its forward or locking position under the influence of the spring 20. The ring is held in this locking position by the spring. The ball and socket joint permits of freedom of movement in all directions and the elongated socket in a horizontal direction permits of sufficient movement to take care of the turning.

What I claim as new is:—

In a trailer hitch, the combination of two interlocking detachable elements, one of which is in the form of a ball and the other in the form of a two-part socket, one part of the socket being hinged to the other, one element being adapted to be secured to a tractor and the other element to a trailer; a movable ring inclosing the socket members for locking said socket in closed position; and a spring actuated toggle lever device yieldingly holding the ring in locked position.

In testimony whereof I have hereunto set my hand.

LAWERNCE R. DAWLEY.